UNITED STATES PATENT OFFICE.

JOHN HARRIS JONES, OF BOUNDBROOK, NEW JERSEY.

PROCESS OF TREATING OILS AND FATS.

1,381,469.  Specification of Letters Patent.  Patented June 14, 1921.

No Drawing.  Application filed December 26, 1917.  Serial No. 208,806.

*To all whom it may concern:*

Be it known that I, JOHN HARRIS JONES, a subject of King George V of England, and a resident of Boundbrook, in the county of Somerset and State of New Jersey, have invented a certain new and useful Invention in Process of Treating Oils and Fats, of which the following is a specification.

The invention relates to a process of treating oils and fats to produce an edible composition for use as butter, oleomargarin, and similar products are now employed, and which obviates various steps in the present processes of producing said materials.

In preparing pure fat butter or cow butter, I am able to utilize a sterilized sweet cream without first culturing the cream, churning said cream directly into a sweet butter, and admixing therewith a base material having the flavor which has heretofore been produced by culturing or fermenting the cream.

This saves such steps in former processes as preparing a culture, providing a "mother culture," and culturing the sweet milk or cream with the mother culture with all the inherent liabilities of the infusion of undesirable bacteria which produce "off" flavors in the finished product.

In carrying out my process, I prepare a vegetable base from an emulsion, starch or paste of wheat flour, rice or barley flour, which may be sterilized. This base is then cultured by the infusion of a suitable bacteria until it develops a lactic fermentation giving the desired butter flavor. The material should then be sterilized to stop further fermentation and the possibility of growing a culture of undesirable type. A sufficient quantity of this base, to give the required flavor to the cream, is mixed with sweet butter which is provided by churning the milk or cream before it is fermented.

I preferably sterilize the cream or fat to be used and then churn it until it congeals in a proper mass. The flavoring material is then added and the whole mixed together, giving a finished product free from liability of internal fermentation and with the desired characteristics as to texture and flavor which are now produced by the more laborious process of ripening the cream before churning. It will be obvious that both the flavoring composition and the fat may be thoroughly sterilized so that a finished product of given characteristic may always be secured.

In carrying out the process still further, by using animal fats and oils such as oleo-oil, beef fat, neutral lard, etc., I obviate the necessity of reducing these materials to their oil form, churning with a cultured milk or butter, and the chilling processes required to collect the churned butters and fats.

It is possible with my process to prepare oleo-oils, stearins, and lards in a single mixing kettle and admixing directly therewith the flavoring material, thus obviating the use of a great number of pieces of apparatus and producing a finished product of uniform character, free from the liability of internal side fermentations which tend to promote "off" flavors and rancidity.

The oils and fats may be admixed with the flavoring compound at temperatures well within the temperature of the melting point of the fat or oil having the highest melting point, thus obviating the necessity of chilling in the cold water bath to collect the congealed material.

I am able to admix the materials, giving a smooth finished product with the desired flavor, at temperatures which permit pouring directly to required containers.

By sterilizing the fats and oils and using a sterile flavoring compound, I produce an article having more definite characteristics as to texture and flavor, and can secure a uniform product which will not have internal re-actions that ordinarily produce deleterious effects.

In a co-pending application Serial No. 208,805, I have described the flavoring base in detail and its method or process of production.

The base has a certain capacity for obsorbing moisture and thus the required moisture for providing a smooth, finished product may be worked into the oils and fats and without liability of moisture exuding of sweat globules forming on the finished product.

This process does away with the necessity for first melting the oils, stearins, and neutral lard; churning these with ripened or cultured skimmed milk or cream; and pouring the product thus formed into a low temperature water bath to cause the mass to congeal with the heavier oils and stearins, holding the lighter oils and milk in suspension. It also obviates the necessity of working, in butter-working machines after the chilling process to give the required texture.

I provide all the above characteristics by mixing the flavoring material directly with the oils and fats at temperatures below the melting points, as described.

What I claim as my invention and desire to secure by Letters Patent is:

1. The process of producing a composition of fat matter which consists in churning the fat into a congealed mass, providing a vegetable base treated by lactic fermentation, and admixing said churned fat and base.

2. The process of producing a composition of fat matter consisting of the mixing of fats and oils at a temperature below the melting point of said materials, and mixing therewith a flavoring material, consisting of a vegetable base, having the flavor of butter produced therein by organized fermentation.

3. The process of producing a composition of fat matter which consists in reducing fats and oils into a mass of homogeneous character and mixing therewith a flavoring material, said material prepared by treating a base of vegetable origin with lactic fermentation, and said admixture being made at temperatures below the melting points of the fats and oils.

4. The process of producing a composition of fat matter which consists in churning fats and oils with an impregnated starch having the flavor of butter produced by lactic fermentation, said admixture being made at a temperature lower than the temperature of the fat having the highest melting point.

JOHN HARRIS JONES.

Witnesses:
 BESSIE A. MILLHEISER,
 EDITH REMOND.